(12) United States Patent
Tamura (10) Patent No.: US 7,852,399 B2
(45) Date of Patent: Dec. 14, 2010

(54) MULTI-EYE IMAGE PICKUP DEVICE

(75) Inventor: Yoshio Tamura, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 438 days.

(21) Appl. No.: 12/058,698

(22) Filed: Mar. 29, 2008

(65) Prior Publication Data
US 2008/0239135 A1 Oct. 2, 2008

(30) Foreign Application Priority Data
Mar. 29, 2007 (JP) ............................. 2007-087591

(51) Int. Cl.
*H04N 5/225* (2006.01)
(52) U.S. Cl. .................................... 348/360; 348/211.9
(58) Field of Classification Search ............ 348/208.11, 348/211.9, 335, 344, 360
See application file for complete search history.

(56) References Cited

U.S. PATENT DOCUMENTS

2006/0051070 A1* 3/2006 Itsukaichi .............. 348/207.99
2008/0131107 A1* 6/2008 Ueno ........................... 396/50
2008/0219654 A1* 9/2008 Border et al. ................. 396/89

FOREIGN PATENT DOCUMENTS

JP 2003-298919 A 10/2003
JP 2004-120527 A 4/2004

* cited by examiner

*Primary Examiner*—Gevell Selby
(74) *Attorney, Agent, or Firm*—Sughrue Mion, PLLC (57) ABSTRACT

A stereo camera comprises a camera body, a lens barrel rotatably attached to the camera body, and a converter lens barrel 14 detachably attached to the camera body. The lens barrel contains a pair of a first imaging optical system and a first CCD, and a pair of a second imaging optical system and a second CCD. When the lens barrel is at an ordinary position, a wide image capturing mode with only the first CCD being activated or a normal image capturing mode with only the second CCD being activated is set. When the lens barrel is at a first rotational position, a panoramic image capturing mode is set. When the lens barrel is at a second rotational position, a stereoscopic image capturing mode is set.

5 Claims, 7 Drawing Sheets

MULTI-EYE IMAGE PICKUP DEVICE

BACKGROUND OF THE INVENTION

1. Field of the Invention

The present invention relates to a multi-eye image pickup device which enables to panoramic image capturing and stereoscopic image capturing.

2. Description of the Related Arts

Recently, digital cameras for converting subject light captured by a solid state imaging element such as a CCD image sensor into digital image data and recording the image data in a storage medium such as a built-in memory and a memory card are in widespread use. As one of such digital cameras, a multi-eye image pickup device (so-called stereo camera) having plural imaging optical systems and solid state imaging elements is known.

Japanese Patent Laid-Open Publication No. 2004-120527 discloses a digital camera which has two pairs of an imaging optical system and a solid state imaging element and performs normal image capturing, panoramic image capturing and stereoscopic image capturing by changing an angle between the imaging optical systems. In addition, Japanese Patent Laid-Open Publication No. 2003-298919 discloses a digital camera which has two imaging optical systems whose focal lengths are different from each other and two solid state imaging elements whose pixel densities are different from each other, and enables high power and seamless zooming by changing a combination of the imaging optical system and the solid state imaging element used together.

However, in the digital camera of Japanese Patent Laid-Open Publication No. 2004-120527, each of two lens barrels containing each imaging optical system needs to be manually rotated for changing an angle between the imaging optical systems. Accordingly, there is a problem of operation ability. In addition, Japanese Patent Laid-Open Publication No. 2003-298919 does not disclose the panoramic image capturing and the stereoscopic image capturing.

SUMMARY OF THE INVENTION

An object of the present invention is to provide a multi-eye image pickup device which enables to perform various image capturing such as normal image capturing, panoramic image capturing and stereoscopic image capturing and has superior operation ability.

In order to achieve the above and other objects, a multi-eye image pickup device of the present invention comprises a camera body, a lens barrel rotatably attached to the camera body, a plurality of imaging optical systems contained in the lens barrel, an image capturing section for image capturing of subject light from each of the imaging optical systems, a rotational position detector for detecting a rotational position of the lens barrel with respect to the camera body, and an optical axis angle changing section for changing an angle between the optical axes of the imaging optical systems.

It is preferable that the lens barrel contains two of the imaging optical systems being arranged across the rotational center of the lens barrel and rotates among an ordinary position where the imaging optical systems are aligned vertical to each other, a first rotational position rotated approximately 90 degreed from the ordinary position in a first direction to align the imaging optical systems horizontal to each other, and a second rotational position rotated approximately 90 degreed from the ordinary position in a second direction which is direction opposite to the first direction to align the imaging optical systems horizontal to each other, and that the optical axis angle changing section enables panoramic image capturing by changing an angle between the optical axes of the imaging optical systems such that an overlap area of images captured with the imaging optical systems becomes small when the lens barrel is at the first rotational position, and enables stereoscopic image capturing by changing an angle between the optical axes of the imaging optical systems such that an overlap area of images captured with the imaging optical systems becomes large when the lens barrel is at the second rotational position.

It is preferable that the multi-eye image pickup device further comprises a power controlling section to power on the multi-eye image pickup device when the lens barrel is at the ordinary position, the first position or the second position, and to power off the multi-eye image pickup device when the lens barrel is at a third position different from the ordinary position, the first position and the second position. In this case, operation ability of the multi-eye image pickup is increased because a power button can be eliminated.

It is preferable that the multi-eye image pickup device further comprises a converter lens barrel being detachably attached to the camera body and holding a conversion lens such that the conversion lens is placed in front of one of the imaging optical systems aligned vertical to each other and the optical axis of the conversion lens coincides with the optical axis of one of the imaging optical systems; and an imaging optical system selector for selecting one of the imaging optical systems to perform image capturing. In this case, further various kinds of image capturing can be performed because of use of the conversion lens. As the conversion lens, there are a tele conversion lens for extending the focal distance, a wide conversion lens for reducing the focal distance and a macro conversion lens for performing close-up image capturing.

It is further preferable to provide the lens barrel with mirrors for reflecting subject light from each imaging optical system, motors for adjusting the tilt angle of each mirror according to the angle between the optical axes of the imaging optical systems, and a reflecting prism for directing the subject light from the mirrors to the image capturing section.

According to the multi-eye image pickup device of the present invention, the angle between the optical axes of the imaging optical systems is changed according to the rotational position of the lens barrel. Accordingly, various image capturing including the panoramic image capturing and the stereoscopic image capturing can be performed with the easy operation for changing the kind of image capturing.

Since the normal image capturing is set when the lens barrel is at the ordinary position, the panoramic image capturing is set when the lens barrel is rotated approximately 90 degree in the first direction from the ordinary position, and the stereoscopic image capturing is set when the lens barrel is rotated approximately 90 degree in the second direction from the ordinary position, the relations between the rotational positions of the lens barrel and the kinds of the image capturing become easy-to-understand and operation ability of the multi-eye image pickup is increased. In addition, when the converter lens barrel detachably attached to the camera body is provided, further various kinds of image capturing can be performed.

BRIEF DESCRIPTION OF THE DRAWINGS

The above and other subjects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE PREFERRED EMBODIMENTS

Figure 1:
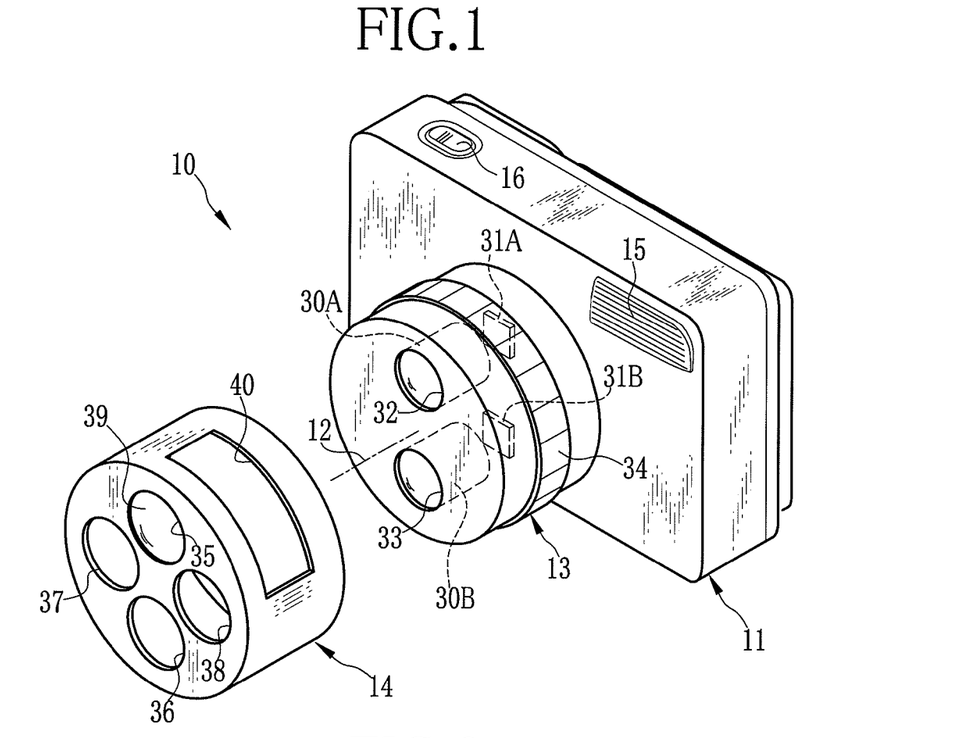
FIG. 1 is a perspective view of a front side of a stereo camera.
Figure 2:
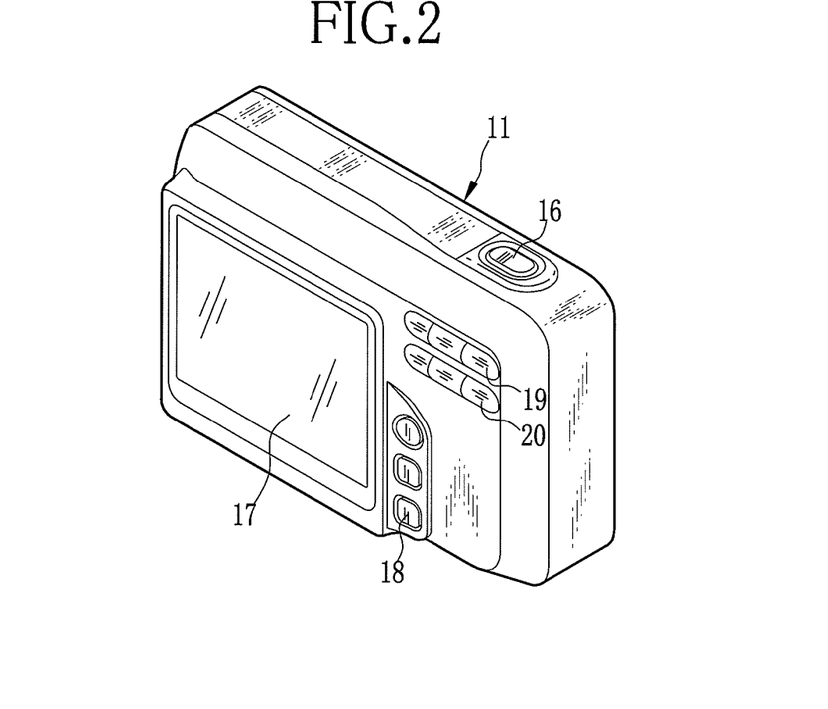
FIG. 2 is a perspective view of a back side of the stereo camera.

As shown in FIG. 1 and FIG. 2, a stereo camera (multi-eye image pickup device) 10 is composed of a camera body 11, a lens barrel 13 equipped rotatably around a rotation axis 12 at the front face of the camera body 11, and a converter lens barrel 14 detachably attached to the camera body 11 so as to cover the lens barrel 13. A flashlight emitter 15 is provided at the front face of the camera body 11, and a release button 16 is provided at the top face of the camera body 11 for being operated in image capturing. A liquid crystal panel 17 for displaying captured images and reproduction images, a panel operating section 18 which is operated with observing a display screen of the liquid crystal panel 17, and first and second zoom operating sections 19 and 20 are provided at the back face of the camera body 11.

The lens barrel 13 contains a first imaging optical system 30A, a second imaging optical system 30B, a first CCD image sensor (hereinafter referred to as the first CCD) 31A provided behind the first imaging optical system 30A, and a second CCD image sensor (hereinafter referred to as the second CCD) 31B provided behind the second imaging optical system 30B. These components are mounted in the lens barrel 13 and rotated with the lens barrel 13. The first and second imaging optical system 30A, 30B use zoom lenses having identical focal length ranges. The imaging optical systems 30A, 30B are respectively exposed from optical windows 32, 33 which are formed at the front face of the lens barrel 13. The first CCD 31A and the second CCD 31B constitute an imaging section.

For the rotation mechanism of the lens barrel 13, a known click stop mechanism is used, and the lens barrel 13 can stop at multiple rotational positions. The lens barrel 13 can be rotated by gripping an operation ring 34 fixed at the outer peripheral surface of the lens barrel 13.

At the front face of the converter lens barrel 14, optical windows 35 to 38 are arranged in the vertical and horizontal directions. Each optical window is larger than the optical windows 32, 33 of the lens barrel 13. A wide conversion lens 39 is built in the optical window 35 which is in the most upper position, and other optical windows 36, 37, 38 penetrate through the front face of the converter lens barrel 14 in the anteroposterior direction. On the side surface of the converter lens barrel 14, an operation opening 40 is formed to expose the operation ring 34 of the lens barrel 13. For the converter lens barrel 14 there is a fixed attachment position on the camera body 11, and the converter lens barrel 14 attached to the camera body 11 is fixed to the camera body 11.

Figure 3A:
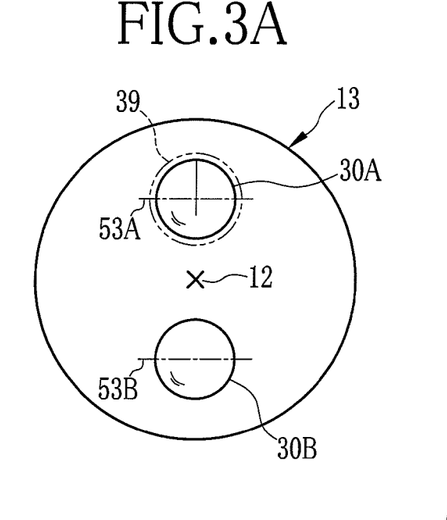
FIG. 3A is an explanatory view of a lens barrel in an ordinary position.
Figure 3B:
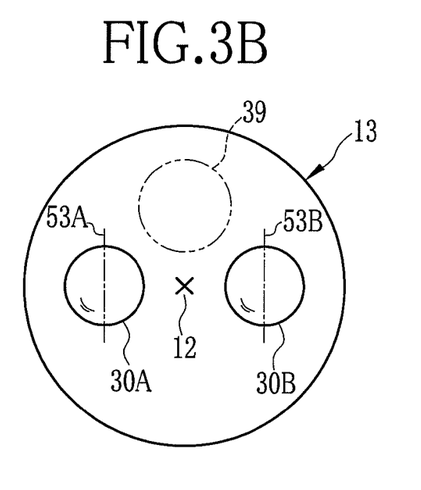
FIG. 3B is an explanatory view of the lens barrel at a first rotational position.
Figure 3C:
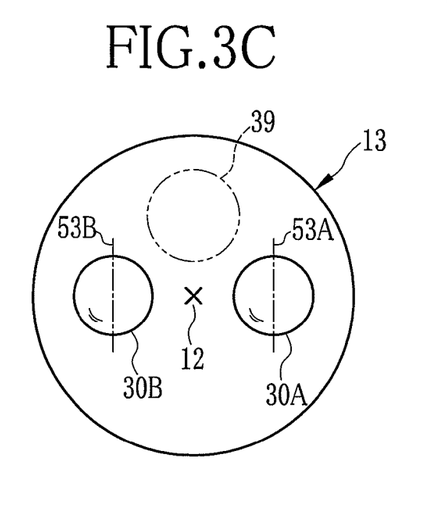
FIG. 3C is an explanatory view of the lens barrel at a second rotational position.
Figure 3D:
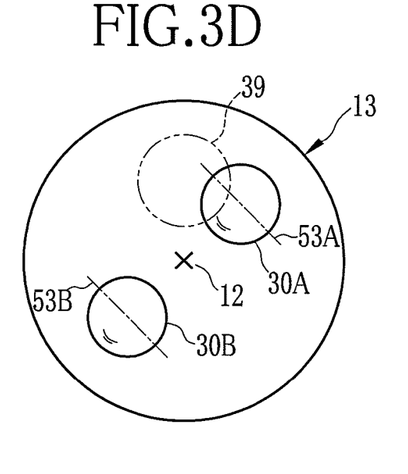
FIG. 3D is an explanatory view of the lens barrel in an off position.

As shown in FIG. 3, the lens barrel 13 rotates between an ordinary position where the first and second imaging optical systems 30A, 30B are vertically aligned (see FIG. 3A), a first rotational position where the first and second imaging optical systems 30A, 30B are horizontally aligned (rotated 90-degree anticlockwise from the ordinary position, see FIG. 3B), a second rotational position where the first and second imaging optical systems 30A, 30B are vertically aligned (rotated 90-degree clockwise from the ordinary position, see FIG. 3C), and an off position (a third rotational position, rotated 45-degree clockwise from the ordinary position, see FIG. 3D). When the lens barrel 13 is at the ordinary position, the wide conversion lens 39 positions in front of the first imaging optical system 30A where the optical axes of them becomes in line. In the ordinary position, wide image capturing with the first imaging optical system 30A or normal image capturing with the second imaging optical system 30B is performed. At the first rotational position, panoramic image capturing with both the first and second imaging optical systems 30A and 30B is performed. At the second rotational position, stereoscopic image capturing with both the first and second imaging optical systems 30A and 30B is performed.

A rotational position sensor 50 (rotational position detector, see FIG. 7) provided in the camera body 11 detects the rotational position of the lens barrel 13. As the rotational position sensor 50, an angle sensor such as a rotary encoder and a potentiometer may be used. Also, it may be that a detecting chip is provided on the lens barrel 13 such that a photo interrupter or another detects the detecting chip when the lens barrel 13 is rotated to each rotational position.

Figure 4A:
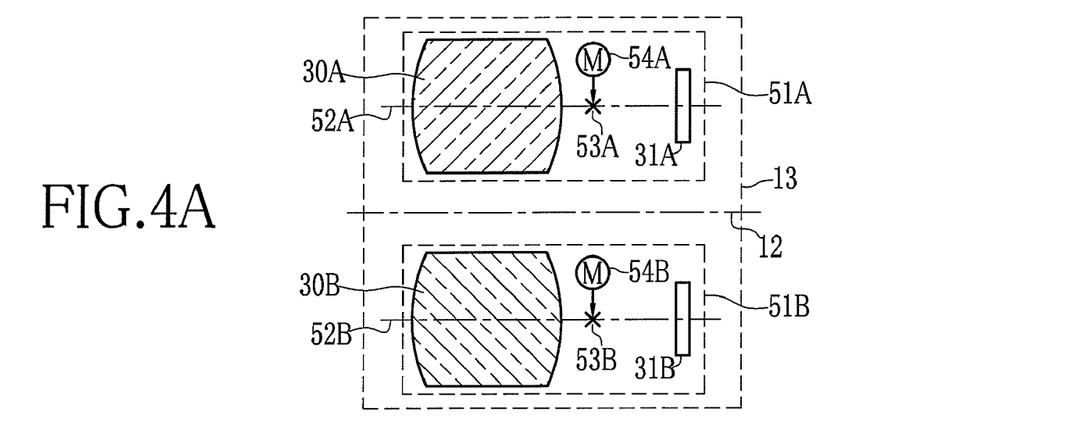
FIG. 4A is an explanatory view of imaging optical systems at a normal image capturing position.
Figure 4B:
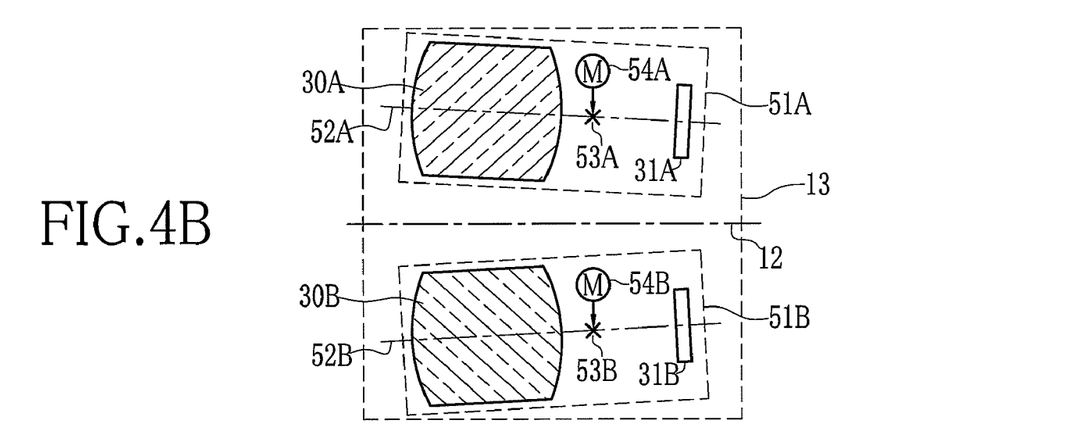
FIG. 4B is an explanatory view of the imaging optical systems at a panoramic image capturing position.
Figure 4C:
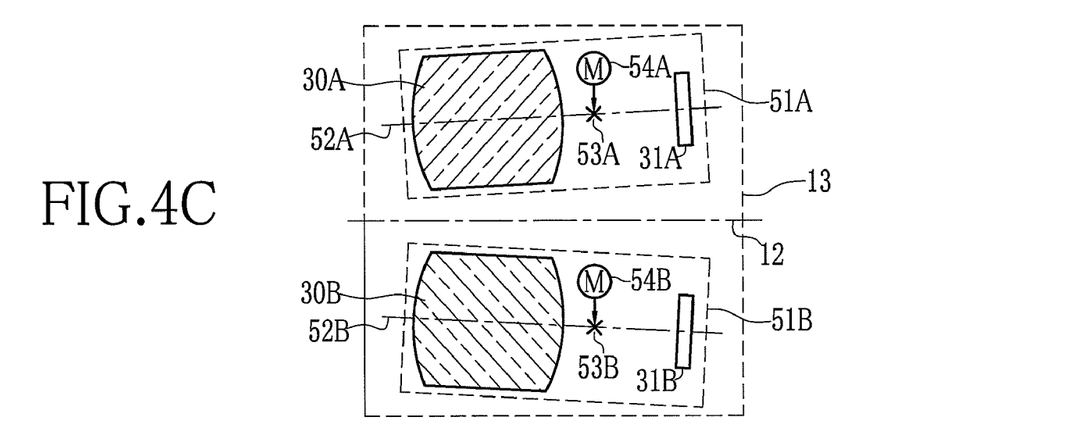
FIG. 4C is an explanatory view of the imaging optical systems at a stereoscopic image capturing position.

As shown in FIG. 4, the first imaging optical system 30A and the first CCD 31A are held by a first holding frame 51A. The first holding frame 51A can swing around a rotational axis 53A (shown as X in FIG. 4) perpendicular to the optical axis 52A of the first imaging optical system 30A, by driving force of a holding frame motor 54A. In addition, the second imaging optical system 30B and the second CCD 31B are held by a second holding frame 51B. The second holding frame 51B can swing around a rotational axis 53B perpendicular to the optical axis 52B of the second imaging optical system 30B, by driving force of a holding frame motor 54B. The rotational axis 53A is parallel to the rotational axis 53B.

By swing of the first and second holding frames 51A and 51B, the first and second imaging optical systems 30A and 30B take a normal image capturing position showed in FIG. 4A when the optical axes 52A and 52B become parallel, a panoramic image capturing position showed in FIG. 4B when the optical axes 52A and 52B tilt so as to intersect with each other at the back side (camera body side), and a stereoscopic image capturing position showed in FIG. 4C when the optic axes 52A and 52B tilt so as to intersect with each other at the front side (subject side).

Figure 5:
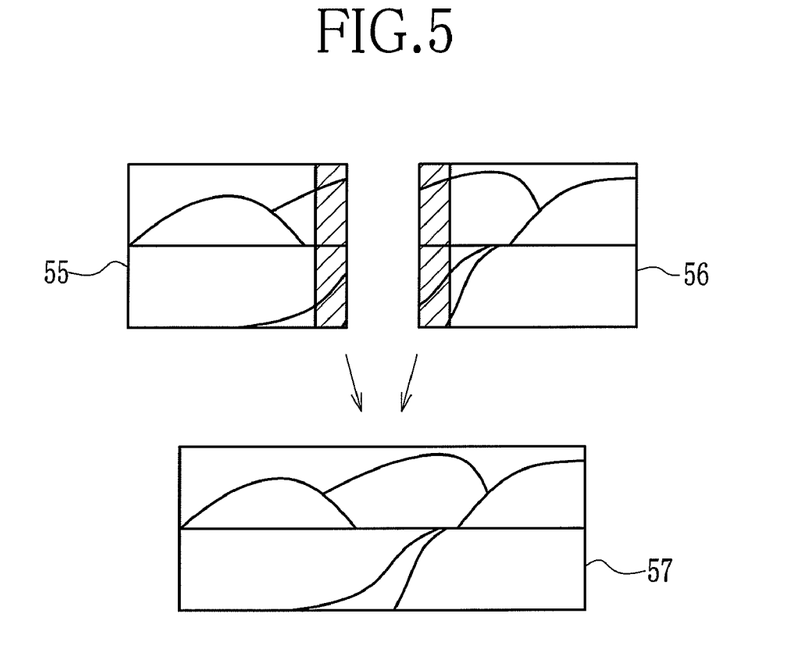
FIG. 5 is an explanatory view of a panoramic image formed from a captured image by the first imaging optical system and a captured image by the second imaging optical system.
Figure 6:
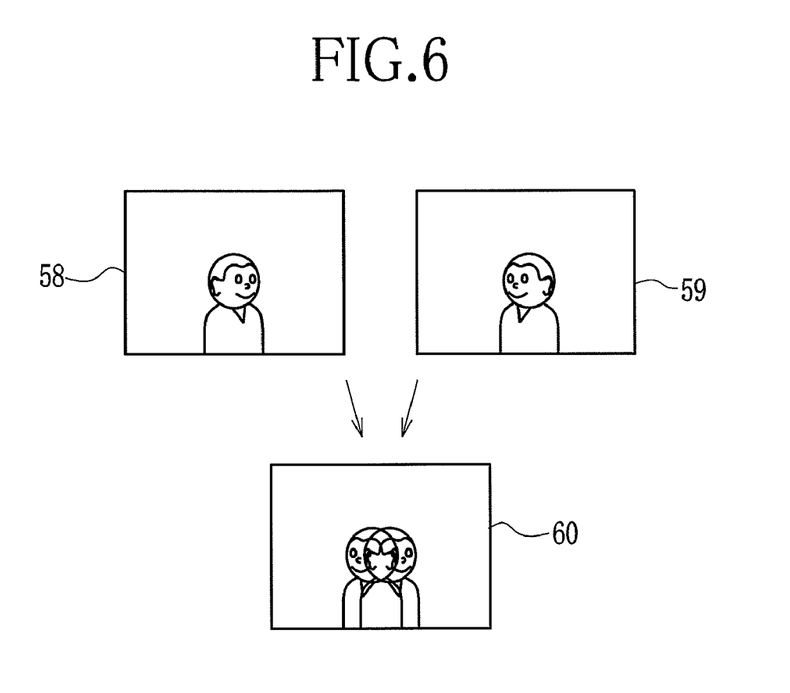
FIG. 6 is an explanatory view of a stereoscopic image formed from a captured image by the first imaging optical system and a captured image by the second imaging optical system.

When the first and second imaging optical system 30A and 30B are at the panoramic image capturing position, as shown in FIG. 5, an overlap area of a captured image 55 from the first CCD 31A and a captured image 56 from the second CCD 31B becomes small (note that a panoramic image 57 is composed by combining areas of the images 55 and 56 shown with diagonal lines). When the first and second imaging optical systems 30A and 30B are at the stereoscopic image capturing position, as shown in FIG. 6, an overlap area of a captured image 58 from the first CCD 31A and a captured image 59 from the second CCD 31B becomes large (note that with use of a stereoscopic image displaying device, a stereoscopic image 60 can be composed from the captured images 58 and 59).

Figure 7:
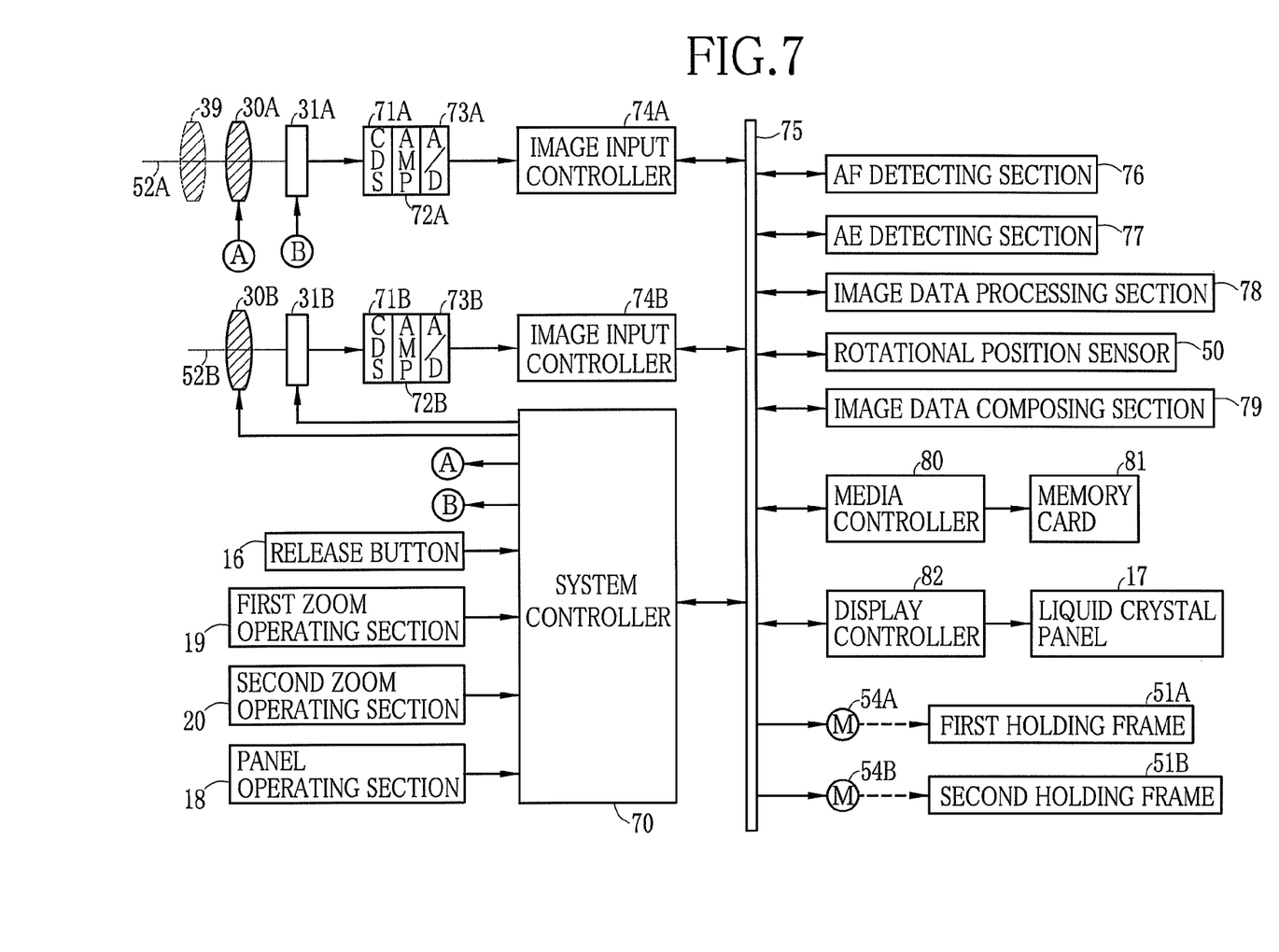
FIG. 7 is a block diagram showing an electric configuration of the stereo camera.

As shown in FIG. 7, a system controller 70 controls each section of the stereo camera 10. The system controller 70 has a built-in memory and this memory stores various programs and various data. The system controller 70 connects to a release button 16, the first and second zoom operating sections 19 and 20 and the panel operating section 18, and reads and executes the corresponding program in response to operations of these operating sections.

The first imaging optical system 30A has a zoom lens and a focus lens. When operating the first zoom operating section 19, the zoom lens moves along the optical axis 52A to perform zooming. In addition, the focus lens moves along the optical axis 52A to perform focusing, according to control of the system controller 70.

The first CCD 31A photoelectrically converts a subject image passing through the first imaging optical system 30A (and the wide conversion lens 39 when the lens barrel 13 is positioned at the ordinary position) into electric image signal. The image signal is output from the first CCD 31A and is input into a CDS (correlated double sampling) circuit 71A for noise removal. Then the image signal is amplified in an amp 72A. After the amplification, the image signal of analog is converted into digital image data in an A/D converter 73A. The image data from the A/D converter 73A is sent to an image input controller 74A. The image input controller 74A controls input of the image data into a bus 75.

The second imaging optical system 30B, the second CCD 31B, a CDS circuit 71B, an amp 72B, an A/D converter 73B and an image input controller 74B respectively have the construction same to the first imaging optical system 30A, the first CCD 31A, the CDS circuit 71A, the amp 72A, the A/D converter 73A and the image input controller 74A. Note that a zoom lens of the second imaging optical system 30B moves in response to operation of the second zoom operating section 20.

The system controller 70, the image input controllers 74A and 74B and other sections are connected to the bus 75. Each section connected to the bus 75 is controlled by the system controller 70 through the bus 75. In addition, data exchange can be performed thorough the bus 75.

An AF detecting section 76 detects contrast of the subject image with use of the image data from the image input controller 74A and sends the contrast information to the system controller 70, for focusing of the first imaging optical system 30A. The AF detecting section 76 performs same processes about image data from the image input controller 74B. The system controller 70 refers the contract information and drives the lens motor to maximize the contrast of the subject image. Accordingly, the focus lens of each imaging optical system can correctly focus on the subject.

An AE detecting section 77 detects brightness of the subject image with use of the image data from the image input controller 74A and sends the brightness in formation to the system controller 70. The AE detecting section 77 performs same processes about image data from the image input controller 74B. The system controller 70 determines a shutter speed of an electronic shutter of each CCD based on the brightness information.

An image data processing section 78 applies white balance correction, gamma correction and so on to the image data from the image input controllers 74A and 74B.

The rotational position sensor 50 is connected to the system controller 70, and the system controller 70 monitors the rotational position of the lens barrel 13 based on output signal from the rotational position sensor 50. The system controller 70 turns off a power supply when the lens barrel 13 is at the off position. The system controller 70 turns on the power supply and controls the holding frame motors 54A and 54B to move the imaging optical systems 30A and 30B to the normal image capturing position (see FIG. 4A) when the lens barrel is at the ordinary position. The system controller 70 turns on the power supply and controls the holding frame motors 54A and 54B to move the imaging optical systems 30A and 30B to the panoramic image capturing position (see FIG. 4B) when the lens barrel is at the first rotational position. The system controller 70 turns on the power supply and controls the holding frame motors 54A and 54B to move the imaging optical systems 30A and 30B to the stereoscopic image capturing position (see FIG. 4C) when the lens barrel is at the second rotational position. As described above, the system controller 70 functions as a power supply controller. The first and second holding frames 51A and 51B, the holding frame motors 54A and 54B and the system controller 70 function as an optical axis angle changing mechanism for changing an angle between the optical axes 52A and 52B of the imaging optical systems 30A and 30B.

In addition, the system controller 70 sets a wide image capturing mode with activating only the first CCD 31A (with use of only the first imaging optical system 30A) or a normal image capturing mode with activating only the second CCD 31B (with use of only the second imaging optical system 30B) when the lens barrel 13 is at the ordinary position. When the lens barrel 13 is at the first rotational position, the system controller 70 sets a panoramic image capturing mode with activating both the first and second CCDs 31A and 31B. When the lens barrel 13 is at the second rotational position, the system controller 70 sets a stereoscopic image capturing mode with activating both the first and second CCDs 31A and 31B. Whether the system controller 70 sets the wide image capturing mode or the normal image capturing mode when the lens barrel 13 is at the ordinary position, can be predetermined by operation of the panel operating section 18 with observing the display screen of the liquid crystal panel 17. The predetermined image capturing mode is memorized in a memory of the system controller 70. As described above, the liquid crystal panel 17, the panel operating section 18 and the system controller 70 function as an imaging optical system selector.

An imaged at a composing section 79 composes panoramic image data from the two imaged at a input from the image input controllers 74A and 74B and subjected to the image processes when the image capturing is performed in the panoramic image capturing mode. When the image capturing is performed in the stereoscopic image capturing mode, the image composing section 79 composes a pair of stereoscopic image data from the two image data input from the image input controllers 74A and 74B.

A media controller 80 controls writing and reading of data to/from a memory card 81. In response to operation of the release button 16, wide image data input from the image input controller 74A and subjected to the image processes is sent to the media controller 80 to be written in the memory card 81 in the wide image capturing mode, normal image data input from the image input controller 74B and subjected to the image processes is sent to the media controller 80 to be written in the memory card 81 in the normal image capturing mode, panoramic image data from the image data composing section 79 is sent to the media controller 80 to be written in the memory card 81 in the panoramic image capturing mode, and a pair of stereoscopic image data is sent to the media controller 80 to be written in the memory card 81 in the stereoscopic image capturing mode.

A display controller 82 determines contents for displaying on the liquid crystal panel 17 based on instruction from the system controller 70, and controls the liquid crystal panel 17 to display the determined contents. The display controller 82 displays image data after the image processes and composing processes as through images on the liquid crystal panel 17 in each image capturing mode. The display controller 82 displays image data read from the memory card 81 as reproduction images on the liquid crystal panel 17 in a reproduction mode. Note that selection of one of the various image capturing modes and the reproduction mode can be performed by operation of a mode dial (not shown).

Figure 8:
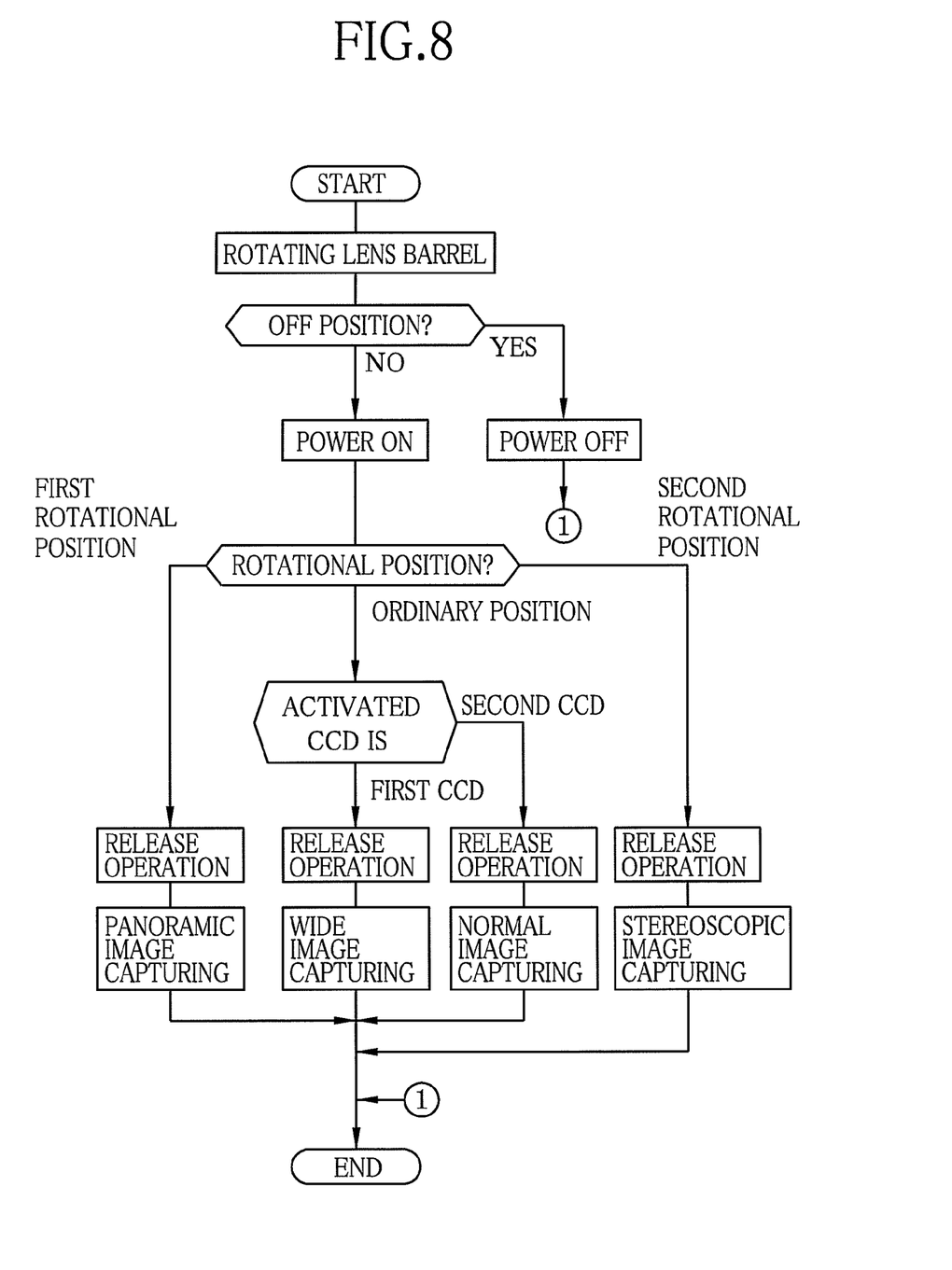
FIG. 8 is a flowchart showing procedures for image capturing operations of the stereo camera.

Next, operation of the above embodiment will be explained with reference to a flowchart of FIG. 8. The converter lens barrel 14 is attached to the camera body 11, and the operation ring 34 of the lens barrel 13 is exposed from the operation opening 40. When the lens barrel 13 is at the off position, the stereo camera 10 is turned off.

When the operation ring 34 is operated to move the lens barrel 13 to the ordinary position, the first imaging optical system 30A is positioned behind the wide conversion lens 39, and the second imaging optical system 30B is positioned behind the optical window 36. In addition, the power of the camera is turned on and the predetermined mode (one of the wide image capturing mode and the normal image capturing mode) is set.

When the wide image capturing mode is set, only the first CCD 31A is activated. In response to pressing the release button 16, subject light passing through the wide conversion lens 39 and the first imaging optical system 30A is photoelectrically converted into wide image data by the first CCD 31A, and the wide image data is recorded in the memory card 81.

When the normal image capturing mode is set, only the second CCD 31B is activated. In response to pressing the release button 16, subject light passing through the second imaging optical system 30B is photoelectrically converted into normal image data by the second CCD 31B, and the normal image data is recorded in the memory card 81. Note that zooming can be performed by operation of the second zoom operating section 20 in image capturing.

When the operation ring 34 is operated to move the lens barrel 13 to the first rotational position, the first imaging optical system 30A is positioned behind the optical window 37, and the second imaging optical system 30B is positioned behind the optical window 38. In addition, the panoramic image capturing mode is automatically set, and the first and second imaging optical systems 30A and 30B move to the panoramic image capturing position. In response to pressing the release button 16, the image data composing section 79 composes panoramic image data from image data formed by photoelectrically converting subject light passing through the first imaging optical system 30A at the first CCD 31A and image data formed by photoelectrically converting subject light passing through the second imaging optical system 30B at the second CCD 31B. The panoramic image data is recorded in the memory card 81.

When the operation ring 34 is operated to move the lens barrel 13 to the second rotational position, the first imaging optical system 30A is positioned behind the optical window 38, and the second imaging optical system 30B is positioned behind the optical window 37. In addition, the stereoscopic image capturing mode is automatically set, and the first and second imaging optical systems 30A and 30B move to the stereoscopic image capturing position. In response to pressing the release button 16, a pair of stereoscopic image data is formed from image data formed by photoelectrically converting subject light passing through the first imaging optical system 30A at the first CCD 31A and image data formed by photoelectrically converting subject light passing through the second imaging optical system 30B at the second CCD 31B. The stereoscopic image data is recorded in the memory card 81.

When the lens barrel 13 is moved to the off position after the image capturing is finished, the first and second imaging optical systems 30A and 30B move to the normal image capturing position, and the power of the camera is turned off.

As described above, according to the present invention, various image capturing modes such as the wide image capturing mode, the normal image capturing mode, the panoramic image capturing mode and the stereoscopic image capturing mode can be selected by only the rotation of the lens barrel 13, that is easy operation.

In the above embodiment, the first and second holding frames 51A and 51B are rotated by the holding frame motors 54A and 54B. However, an interlocking mechanism for rotating the first and second holding frames 51A and 51B by mechanically interlocking with the rotation of the lens barrel 13 may be used instead of the motors.

In the above embodiment, the wide conversion lens 39 is mounted in the optical window 35 of the converter lens barrel 14. However, auxiliary lenses such as a tele conversion lens, a macro conversion lens, and optical components for changing optical property of subject light such as an infrared filter can be mounted instead of the wide conversion lens 39.

In the above embodiment, the mode dial (not shown) is used for switching from the image capturing mode to the reproduction mode. However, it may be that the reproduction mode is set when the lens barrel 13 is moved to a predetermined rotational position. The rotational position for the reproduction mode is for example set at a position rotated 180 degrees from the ordinary position.

In the above embodiment, the lens barrel 13 is rotated by hand. However, the lens barrel 13 can be automatically rotated in response to user's operation. In this case, a driving mechanism for rotating the lens barrel 13, and an operating section for operating the driving mechanism are provided. Although two imaging optical systems are provided in the above embodiment, three or more imaging optical systems can be provided.

Figure 9:
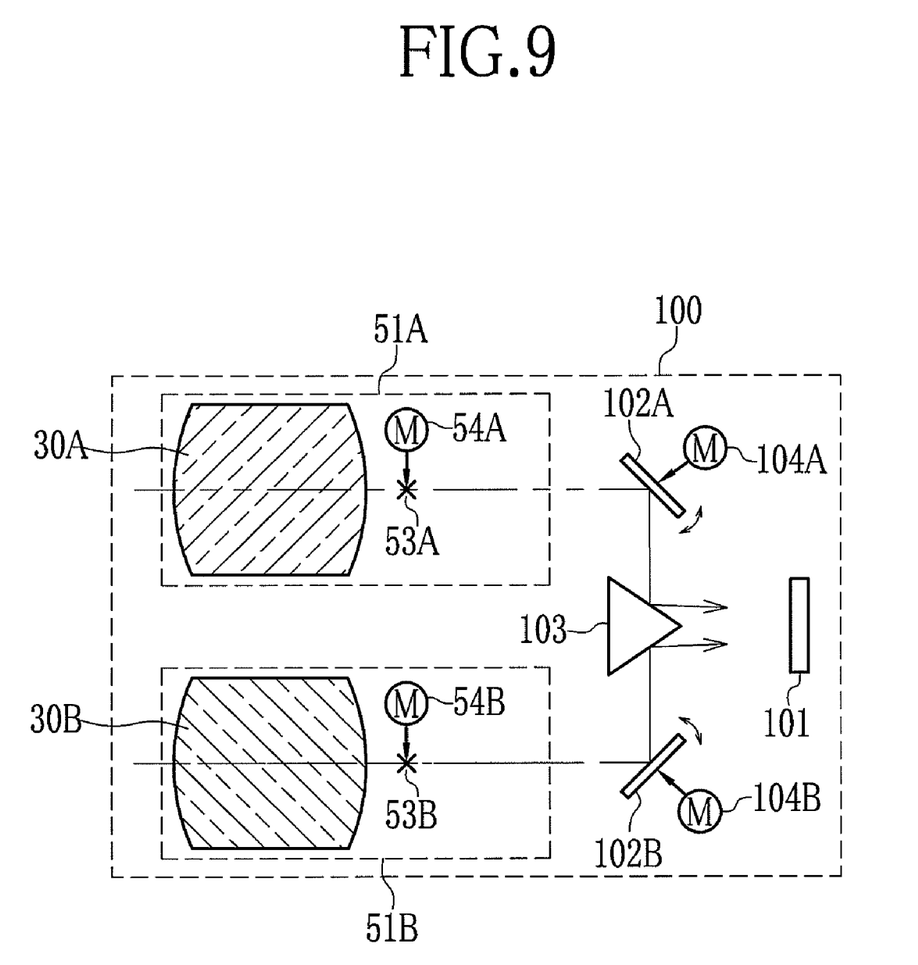
FIG. 9 is a configuration diagram of an embodiment of the lens barrel with one CCD.

In the above embodiment, two CCDs (the first and second CCDs 31A and 31B) are used for respective image capturing of subject light passing through the first imaging optical system 30A and subject light passing through the second imaging optical system 30B. However, one CCD for capturing respective subject light with time difference of arrival can be used instead. As shown in FIG. 9, a CCD 101, a mirror 102A for reflecting subject light passing through the first imaging optical system 30A, a mirror 102B for reflecting subject light passing through the second imaging optical system 30B, a reflecting prism 103 for leading the subject light reflected by the mirrors 102A and 102B to the CCD 101, and motors 104A and 104B for controlling a tilt angle of each of the mirrors 102A and 102B are provided in a lens barrel 100. The tilt angle of each of the mirrors 102A and 102B is adjusted by the each of the motors 104A and 104B, so that the mirror can correctly lead subject light to the CCD 101 even when the imaging optical systems 30A and 30B change the angle between their optical axes.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

In the above embodiment, the first zoom operating section is operated for zooming of the first imaging optical system and the second zoom operating section is operated for zooming of the second imaging optical system. However, one zoom operating section may be operated for zooming of the first and second imaging optical systems.

What is claimed is:

1. A multi-eye image pickup device comprising:
   a camera body;
   a lens barrel rotatably attached to said camera body;
   a plurality of imaging optical systems contained in said lens barrel;
   an image capturing section for image capturing of subject light from each of said imaging optical systems;
   a rotational position detector for detecting a rotational position of said lens barrel with respect to said camera body; and
   an optical axis angle changing section for changing an angle between optical axes of said imaging optical systems based on the rotational position of said lens barrel.

2. A multi-eye image pickup device claimed in claim 1, wherein said lens barrel contains two of said imaging optical systems being arranged across the rotational center of said lens barrel and rotates among an ordinary position where said imaging optical systems are aligned vertical to each other, a first rotational position rotated approximately 90 degreed from said ordinary position in a first direction to align said imaging optical systems horizontal to each other, and a second rotational position rotated approximately 90 degreed from said ordinary position in a second direction which is direction opposite to the first direction to align said imaging optical systems horizontal to each other,
   and wherein said optical axis angle changing section enables panoramic image capturing by changing an angle between said optical axes such that an overlap area of images captured with said imaging optical systems becomes small when said lens barrel is at said first rotational position, and enables stereoscopic image capturing by changing an angle between said optical axes such that an overlap area of images captured with said imaging optical systems becomes large when said lens barrel is at said second rotational position.

3. A multi-eye image pickup device claimed in claim 2, further comprising a power controlling section to power on said multi-eye image pickup device when said lens barrel is at said ordinary position, said first position or said second position, and to power off said multi-eye image pickup device when said lens barrel is at a third position different from said ordinary position, said first position and said second position.

4. A multi-eye image pickup device claimed in claim 2, further comprising:
   a converter lens barrel being detachably attached to said camera body and holding a conversion lens such that said conversion lens is placed in front of one of said imaging optical systems aligned vertical to each other and the optical axis of said conversion lens coincides with the optical axis of one of said imaging optical systems; and
   an imaging optical system selector for selecting one of said imaging optical systems to perform image capturing.

5. A multi-eye image pickup device claimed in claim 1, wherein said lens barrel further comprises:
   mirrors for reflecting subject light from each of said imaging optical systems;
   motors for adjusting tilt angles of each of said mirrors according to an angle between the optical axes of said imaging optical systems; and
   a reflecting prism for directing said subject light reflected by said mirrors to said image capturing section, said imaging capturing section capturing subject light with time difference of arrival from each of the imaging optical systems.

* * * * *